(12) United States Patent
Horng et al.

(10) Patent No.: US 6,739,814 B1
(45) Date of Patent: May 25, 2004

(54) RETAINING RING FOR A ROTOR

(75) Inventors: Alex Horng, Kaohsiung (TW); Tso-Kuo Yin, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/309,258

(22) Filed: Dec. 4, 2002

(51) Int. Cl.⁷ .............................. F16B 21/00; F16B 21/18
(52) U.S. Cl. ....................... 411/339; 411/526; 310/40 R
(58) Field of Search ................................... 411/338, 339, 411/521, 526, 525, 527; 310/40 R

(56) References Cited

U.S. PATENT DOCUMENTS

| 1,862,275 A | * | 6/1932 | Menut ..................... 411/526 X |
| 3,893,221 A | * | 7/1975 | Lehmann ................ 411/526 X |
| 5,195,860 A | * | 3/1993 | Steyn ........................... 411/526 |
| 5,833,422 A | * | 11/1998 | Haga et al. ................. 411/526 |

* cited by examiner

*Primary Examiner*—Neill Wlison
(74) *Attorney, Agent, or Firm*—Bacon & Thomas, PLLC

(57) ABSTRACT

A retaining ring in accordance with the present invention mainly includes an outer circumference and an inner circumference. The inner circumference has a slightly narrow diameter adapted to fittingly engage with an outer circumference of a shaft.

8 Claims, 5 Drawing Sheets

RETAINING RING FOR A ROTOR

BACKGROUND OF THE INVENTION

1. Field of the Invention

The present invention is related to a retaining ring for a rotor and more particularly to the retaining ring having a slightly narrow inner circumference adapted to engage with an outer circumference of a shaft.

2. Description of the Related Art

Referring to FIG. 1, a conventional motor includes a rotor 90, a shaft 91, a stator 92 and a bearing hole 93. The shaft 91 is extended beyond the bearing hole 93, so that an end of the shaft 91 is projected from the stator 92. The end of the shaft 91 is provided with an annular groove 94 adapted to engage with a C clip 95 so as to confine the shaft 91 within an axial space defined by the bearing hole 93. Consequently, the rotor 90 and the stator 92 cannot be disassembled.

However, a manufacturing process for cutting an annular groove 94 is complicated if a diameter of the shaft 91 is thin. Also an assembling process may be sophisticated if a diameter of the shaft 91 is ultimately thin.

The present invention intends to provide a retaining ring for a rotor simplifying both of a manufacturing process and an assembling process in such a way to mitigate and overcome the above problem.

SUMMARY OF THE INVENTION

The primary objective of this invention is to provide a retaining ring having a slightly narrow inner circumference adapted to simplify both of a manufacturing process and an assembling process.

The secondary objective of this invention is to provide the retaining ring having a slightly narrow inner circumference for attenuating the abrasion.

The retaining ring in accordance with the present invention mainly includes an outer circumference and an inner circumference. The inner circumference has a slightly narrow diameter adapted to fittingly engage with an outer circumference of a shaft.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
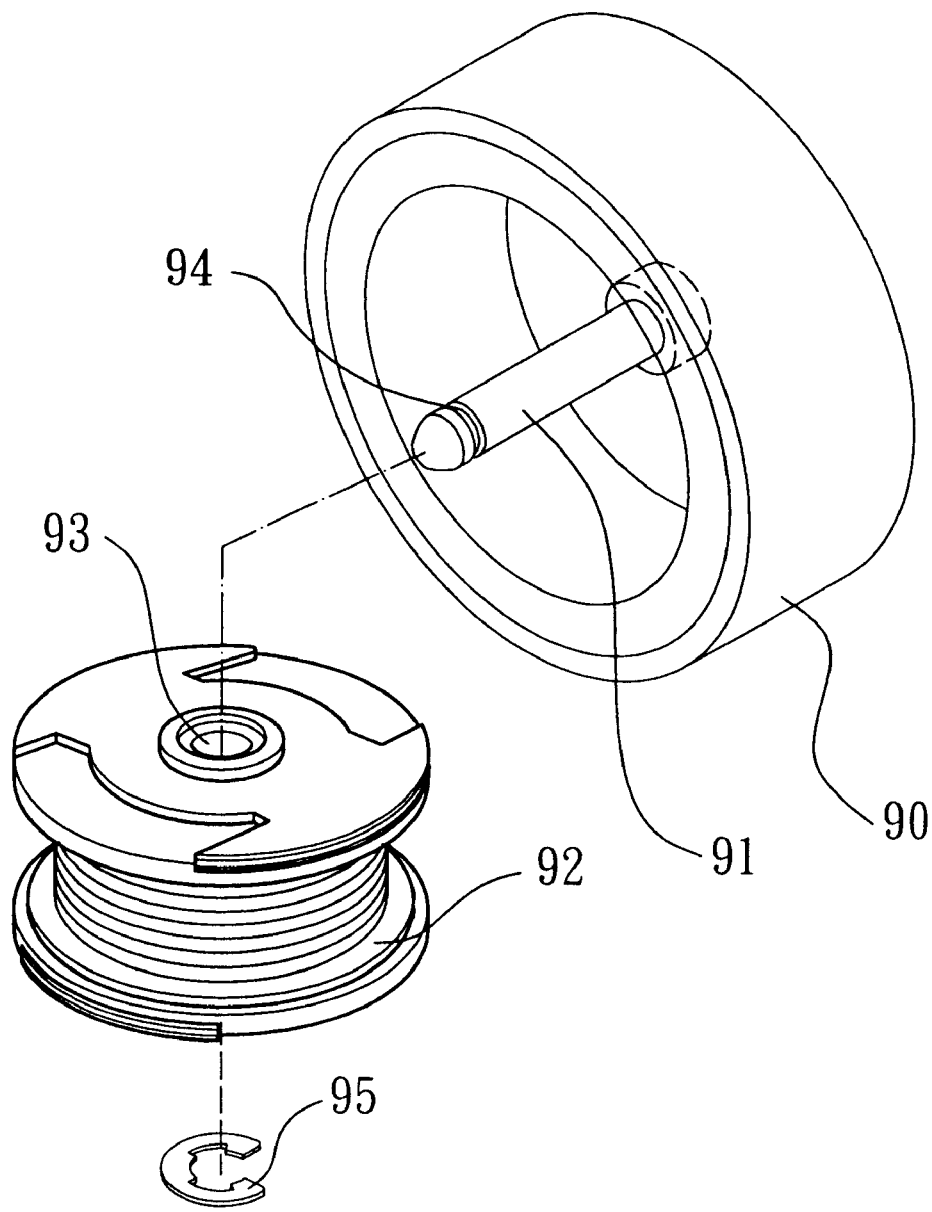
FIG. 1 is an exploded perspective view of conventional motor member in accordance with a prior art.

Referring now to the drawings, there are three embodiments of the present invention shown therein, all of which include generally a primary retaining ring member and secondary motor members.

Figure 2:
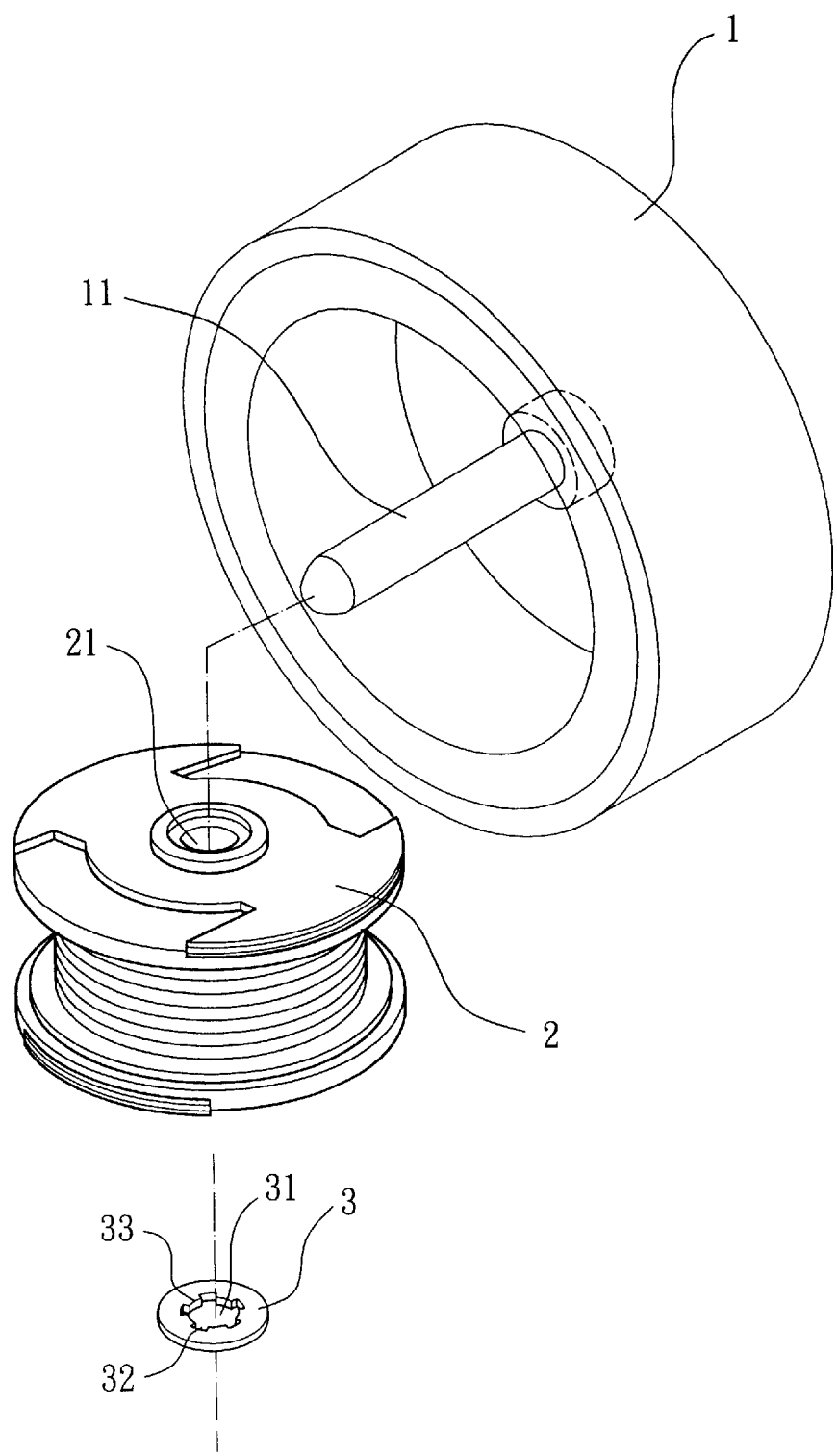
FIG. 2 is an exploded perspective view of a retaining ring and motor members in accordance with a first embodiment of the present invention.
Figure 3:
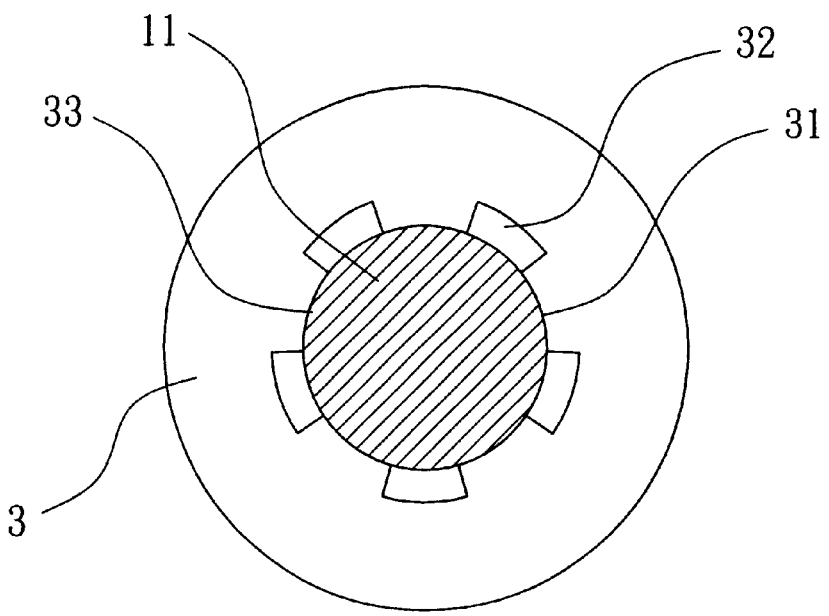
FIG. 3 is an enlarged partial cross-sectional view of the retaining ring combined with a shaft in accordance with the first embodiment of the present invention.

Referring initially to FIGS. 2 and 3, a motor includes a rotor designated as numeral 1, a stator designated as numeral 2, and a retaining ring designated as numeral 3.

Assembling the rotor 1 and the stator 2 shall be described in detail, referring again to FIG. 2. The rotor 1 includes a shaft 11 extended beyond a bearing hole 21 of the rotor 2 so as to allow free rotation.

Construction of the retaining ring 3 shall be described in detail, referring again to FIGS. 2 and 3. The retaining ring 3 is made of metal or plastic and includes an axial hole 31 defined by an inner circumference. The axial hole 31 communicates with either side surface of the retaining ring 3. The inner circumference consists of a plurality of notches 32 and a plurality of engaging protrusions 33. Notches 32 alternate with protrusions 33 and are equally spaced around the inner circumference of the retaining ring 3. An inner diameter, formed by top portions of the engaging protrusions 33, is slightly narrower than an outer diameter of an outer circumference of the shaft 11. During an assembling process, the axial hole 31 of the retaining ring 3 is capable of fittingly engaging with the outer circumference of the shaft 11 by punching.

Referring to FIG. 3, as the shaft 11 is axially extended a predetermined distance into the axial hole 31 of the retaining ring 3 the outer circumference of the shaft 11 is fittingly engaged with the slightly deformed top portions of the engaging protrusions 33 (not shown). Since the axial hole 31 of the retaining ring 3 is fittingly engaged with the outer circumference of the shaft 11, the retaining ring 3 will rotate with the shaft 11 to retain the shaft 11 in the bearing hole and prevent the rotor 1 from releasing from the stator 2 during rotation.

Figure 5:
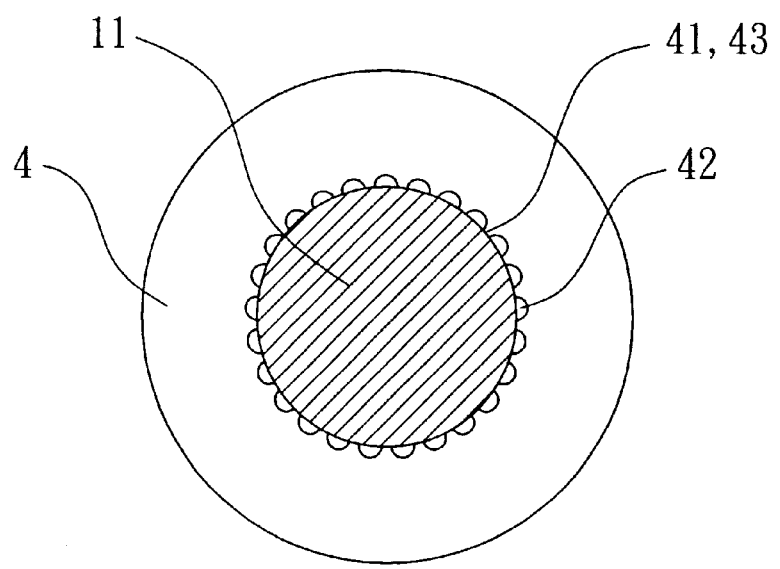
FIG. 5 is an enlarged partial cross-sectional view of the retaining ring combined with a shaft in accordance with the second embodiment of the present invention.
Figure 4:
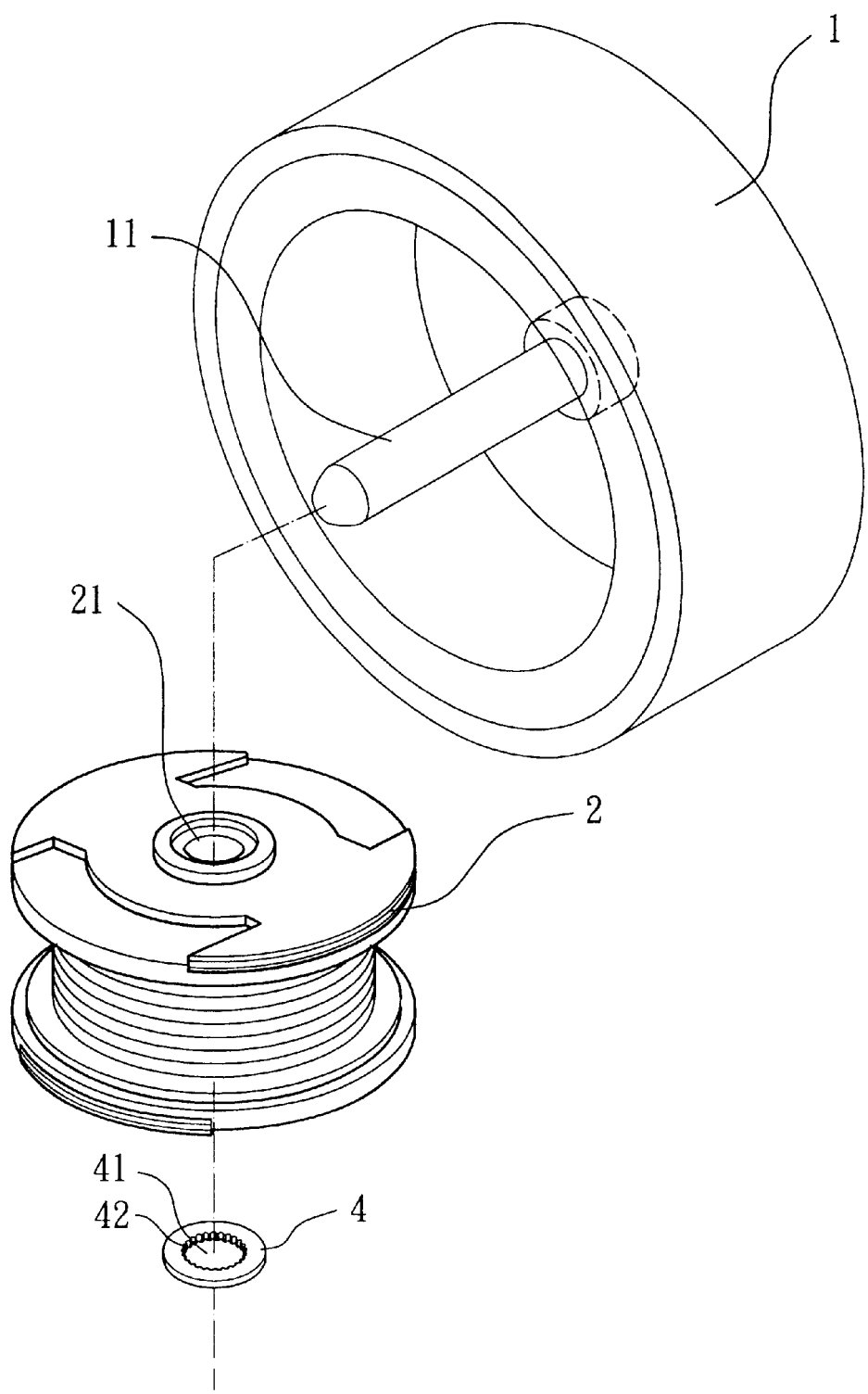
FIG. 4 is an exploded perspective view of a retaining ring and motor members in accordance with a second embodiment of the present invention.

Referring to FIGS. 4 and 5, common reference numerals are used to indicate elements of the second embodiment that are identical to those of the first embodiment. The rotor 1 and the stator 2 of the second embodiment have the similar configuration and same function as the first embodiment and the detailed descriptions are omitted.

Referring to FIGS. 4 and 5, a retaining ring 4 in accordance with the second embodiment of the present invention includes an axial hole 41 defined by an inner circumference. The inner circumference consists of a plurality of recessions 42 and a plurality of engaging teeth 43. An inner diameter, formed by top portions of the engaging teeth 43, is slightly narrower than an outer diameter of an outer circumference of the shaft 11. During an assembling process, the axial hole 41 of the retaining ring 4 is capable of fittingly engaging with the outer circumference of the shaft 11 by punching. As the shaft 11 is axially extended a predetermined distance into the axial hole 41 of the retaining ring 4 the outer circumference of the shaft 11 is fittingly engaged with the slightly deformed top portions of the engaging teeth 43 (not shown).

Figure 6:
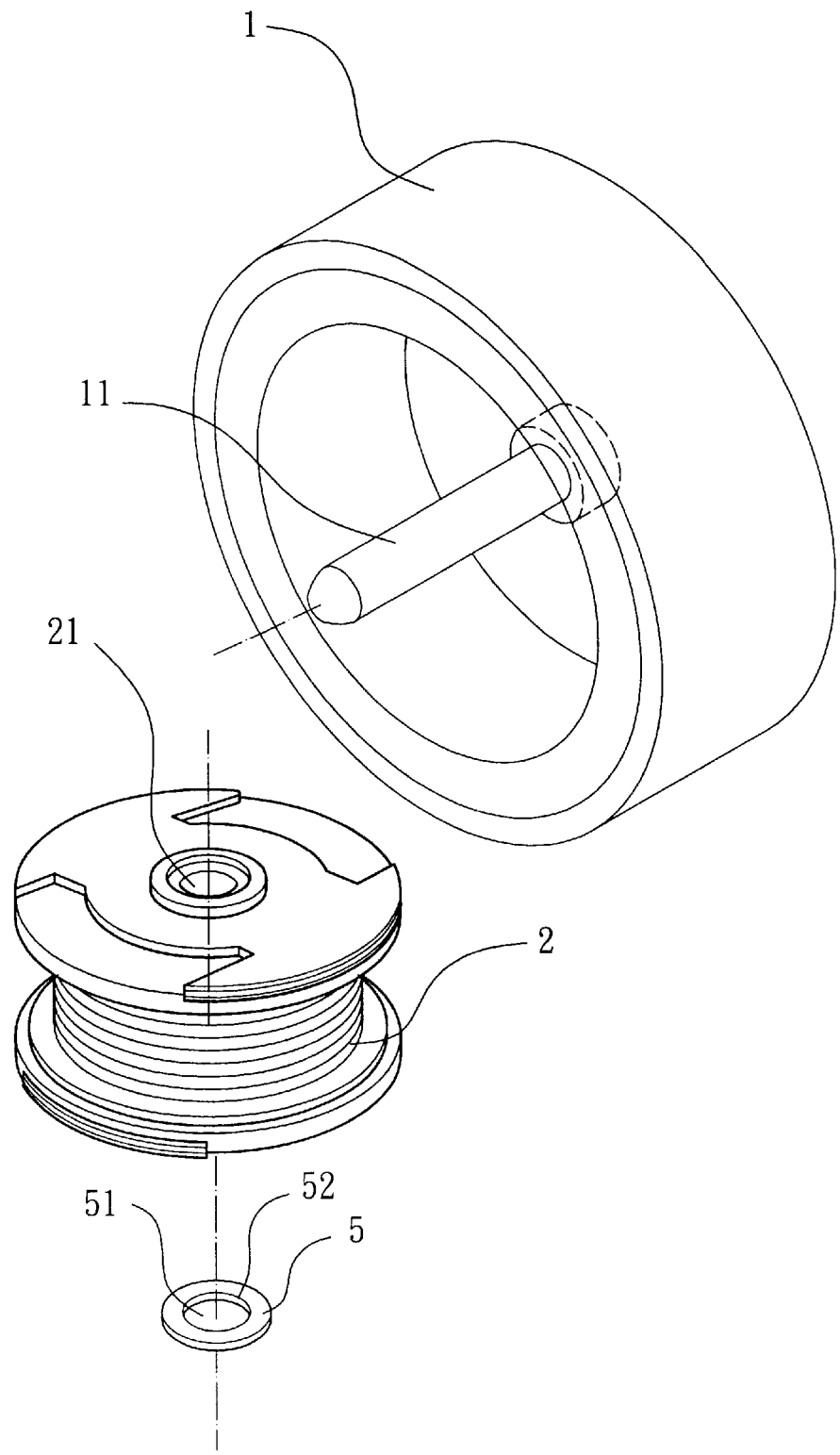
FIG. 6 is an exploded perspective view of a retaining ring and motor members in accordance with a third embodiment of the present invention.

Referring to FIG. 6, common reference numerals are used to indicate elements of the third embodiment that are identical to those of the first embodiment. The rotor 1 and the stator 2 of the third embodiment have the similar configuration and same function as the first embodiment and the detailed descriptions are omitted.

Referring to FIG. 6, a retaining ring 5 in accordance with the third embodiment of the present invention includes an axial hole 51 defined by an inner circumference 52. An inner diameter of the inner circumference is slightly narrower than an outer diameter of an outer circumference of the shaft 11. During an assembling process, the axial hole 51 of the retaining ring 5 is capable of fittingly engaging with the outer circumference of the shaft 11 by punching. As the shaft 11 is axially extended a predetermined distance into the axial hole 51 of the retaining ring 5 the outer circumference of the shaft 11 is fittingly engaged with the slightly deformed inner circumference 52 of the retaining ring 5 (not shown).

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A retaining ring comprising:
   an axial hole communicating with a first side surface and a second side surface of the retaining rig; and
   an inner circumference defining the axial hole and having an inner diameter that is slightly narrower than an outer diameter of a rotary shaft extending into a bearing hole of a motor stator,
   the shaft being extended a predetermined distance into the axial hole and the inner circumference being fittingly engaged with an outer circumference of the shaft to cause the retaining ring to rotate with the shaft relative to the stator, and to prevent withdrawal of the shaft from the bearing hole.

2. The retaining ring as defined in claim 1, wherein the inner circumference consists of a plurality of notches and a plurality of engaging protrusions.

3. The retaining ring as defined in claim 2, wherein the notches and engaging protrusions alternate and are equally spaced around said inner circumference.

4. The retaining ring as defined in claim 1, wherein the inner circumference consists of a plurality of recessions and a plurality of engaging teeth.

5. A stator and shaft assembly for a motor, comprising:
   a stator including a bearing hole;
   a rotary shaft extending through the bearing hole and retained by a retaining ring,
   wherein the retaining ring comprises: <an axial hole communicating with a first side surface to and a second side surface of the retaining ring; and
   an inner circumference defining the axial hole and having an inner diameter that is slightly narrower than an outer diameter of a rotary shaft extending into a bearing hole of a motor stator,
   the shaft being extended a predetermined distance into the axial hole and the inner circumference being fittingly engaged with an outer circumference of the shaft to cause the retaining ring to rotate with the shaft relative to the stator, and to prevent withdrawal of the shaft from the bearing hole.

6. The retaining ring as defined in claim 5, wherein the inner circumference consists of a plurality of notches and a plurality of engaging protrusions.

7. The retaining ring as defined in claim 6, wherein the notches and engaging protrusions alternate.

8. The retaining ring as defined in claim 5, wherein the inner circumference consists of a plurality of recessions and a plurality of engaging teeth.

* * * * *